(12) United States Patent  (10) Patent No.: US 9,537,763 B2
Yamato et al.  (45) Date of Patent: Jan. 3, 2017

(54) COMMUNICATION SYSTEM, CONTROL APPARATUS, CONTROL METHOD AND PROGRAM

(71) Applicant: NEC Corporation, Tokyo (JP)

(72) Inventors: Junichi Yamato, Tokyo (JP); Kazuya Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 90 days.

(21) Appl. No.: 14/381,651

(22) PCT Filed: Feb. 28, 2013

(86) PCT No.: PCT/JP2013/001251
§ 371 (c)(1),
(2) Date: Aug. 28, 2014

(87) PCT Pub. No.: WO2013/128938
PCT Pub. Date: Sep. 6, 2013

(65) Prior Publication Data
US 2015/0023353 A1 Jan. 22, 2015

(30) Foreign Application Priority Data
Mar. 2, 2012 (JP) .................. 2012-046425

(51) Int. Cl.
H04L 12/721 (2013.01)
H04L 29/12 (2006.01)
(52) U.S. Cl.
CPC ............ H04L 45/34 (2013.01); H04L 61/103 (2013.01)

(58) Field of Classification Search
None
See application file for complete search history.

(56) References Cited

U.S. PATENT DOCUMENTS 8,737,215 B2 5/2014 Uchida et al.
2009/0138577 A1 5/2009 Casado et al.
(Continued)

FOREIGN PATENT DOCUMENTS

EP 2355423 1/2011
JP 05-56050 3/1993
(Continued)

OTHER PUBLICATIONS

International Search Report PCT/JP2013/001251 dated Apr. 2, 2013.

Primary Examiner — Jung Park
Assistant Examiner — Jamaal Henson
(74) Attorney, Agent, or Firm — Young & Thompson

(57) ABSTRACT

A communication system includes: a plurality of nodes each of which requests a processing rule for processing a received packet; and a control apparatus that determines in response the request a processing rule corresponding to the received packet and notifies the determined processing rule to at least one of the plurality of nodes. One of the plurality of nodes forwards to the control apparatus a first packet for acquiring a destination address for a predetermined communication. The control apparatus in response to determination of the destination address determines a processing rule for processing a second packet to be transmitted to the destination address and notifies the determined processing rule to at least one of the plurality of nodes.

13 Claims, 16 Drawing Sheets

(56) References Cited

U.S. PATENT DOCUMENTS

| | | | | |
|---|---|---|---|---|
| 2010/0061272 A1* | 3/2010 | Veillette | ............... | H04L 45/34 370/254 |
| 2011/0072132 A1* | 3/2011 | Shafer | ............... | G06Q 10/087 709/224 |
| 2011/0310901 A1 | 12/2011 | Uchida et al. | | |
| 2012/0113989 A1* | 5/2012 | Akiyoshi | ............... | H04L 45/02 370/392 |
| 2013/0022045 A1* | 1/2013 | An | ............... | H04L 45/025 370/392 |

FOREIGN PATENT DOCUMENTS

| | | |
|---|---|---|
| JP | 2010-541426 | 12/2010 |
| WO | 2011102312 | 8/2011 |

\* cited by examiner

Fig. 9

| IP ADDRESS | MAC ADDRESS |
|---|---|
| IP ADDRESS A OF APPARATUS 1 | MAC ADDRESS A' OF APPARATUS 1 |
| IP ADDRESS B OF APPARATUS 2 | MAC ADDRESS B' OF APPARATUS 2 |
| ... | ... |
| IP ADDRESS N OF APPARATUS N | MAC ADDRESS N' OF APPARATUS N |

Fig. 15

| HOST NAME | IP ADDRESS |
| --- | --- |
| HOST NAME A OF APPARATUS 1 | IP ADDRESS A OF APPARATUS 1 |
| HOST NAME B OF APPARATUS 2 | IP ADDRESS B OF APPARATUS 2 |
| ... | ... |
| HOST NAME N OF APPARATUS N | IP ADDRESS N OF APPARATUS N |

COMMUNICATION SYSTEM, CONTROL APPARATUS, CONTROL METHOD AND PROGRAM

FIELD

Cross-Reference to Related Applications

The present invention is based upon and claims the benefit of the priority of Japanese patent application No. 2012-046425, filed on Mar. 2, 2012, the disclosure of which is incorporated herein in its entirety by reference thereto.

The present invention relates to a communication system, a control apparatus, a control method and a program. The invention relates to a technology for setting a communication path.

BACKGROUND

When apparatuses connected through a network mutually perform packet transmission and reception, an apparatus of a transmission source (hereinafter referred to as "source apparatus") may acquire an address of an apparatus of a transmission destination (hereinafter referred to as "destination apparatus") prior to transmission of the packet with data stored therein (hereinafter referred to as "data packet").

Patent Literature (PTL) 1 discloses acquiring of a MAC address of a destination apparatus by a source apparatus using an ARP (Address Resolution Protocol). In Patent Literature 1, the source apparatus that does not know the MAC address of the destination apparatus transmits a broadcast packet including an IP address of the destination apparatus. The apparatus to which the IP address included in the broadcast packet is assigned transmits a response packet including the MAC address of its own apparatus to the source apparatus. With this arrangement, the source apparatus can acquire the MAC address of the destination apparatus.

On the other hand, there is provided a centralized control type network path control method where control over a packet forwarding path using a plurality of nodes is concentratedly performed by a control apparatus. As an example of the technology of such a centralized control type, there is provided an OpenFlow (OpenFlow) technology.

Patent Literature 2 discloses a path control method of the centralized control type using the OpenFlow technology. In the OpenFlow technology described in Patent Literature 2, communication is regarded as an end-to-end flow, and path control, load distribution, and path optimization are performed on a per-flow basis.

Referring to Patent Literature 2, a switch that functions as a forwarding node includes a secure channel for communication with a control apparatus (also termed as "controller") that calculates a packet path, and operates according to a flow table set by the control apparatus. In the flow table, a set of a matching rule to be matched against packet header information and an action defining processing content to be applied to a packet that matches the matching rule is defined. The action includes processing such as forwarding the packet to a specific interface.

When the switch described in Patent Literature 2 receives a packet from a terminal, the switch searches the flow table for a processing rule (flow entry) having a matching rule that matches header information of the received packet. When the processing rule (flow entry) that matches the received packet is found as a result of the search, the switch executes processing content forwarding the received packet to a specific interface) described in the action field of the flow entry.

On the other hand, when the flow entry that matches the packet is not found as a result of the search, the switch requests the control apparatus to set the flow entry for the received packet. The control apparatus calculates a path for the received packet and notifies the flow entry for implementing forwarding using the path to the switch related to the calculated path, in response to the request. The switch that has received the notification of the flow entry updates the flow table, and executes the processing content described in the flow entry in the updated flow entry, or executes forwarding of the received packet.

CITATION LIST

Patent Literature

[PTL 1] JP Patent Kokai Publication No. JP-H05-56050A
[PTL 2] JP Patent Kohyou Publication No. JP2010-541426A

SUMMARY

Technical Problem

The entire disclosures of the above mentioned Patent Literatures are incorporated herein by reference thereto. The following analyses are given by the present invention.

When data to be transmitted is generated, a source apparatus executes the followings:

(1) The source apparatus transmits a packet that requests an address of a destination apparatus; and
(2) The source apparatus transmits a data packet using the acquired address as a destination after the source apparatus has acquired the requested address.

On the other hand, the switch in the related art disclosed in Patent Literature 2 recognizes that the packet used for acquisition of the address and the data packet with the acquired address used as the destination belong to different flows because the packet used for acquisition of the address and the data packet the acquired address used as the destination have different header information. Consequently, the switch requests the control apparatus to set a flow entry for each of the packet used for acquisition of the address and the data packet.

Thus, the control apparatus needs to calculate the entry for each of the packet used for acquisition of the address and the data packet, which will cause an increase in the calculation load of the control apparatus, offering a problem in the art.

Solution to Problem

According to a first aspect of the present invention, there is provided a communication system, comprising: a plurality of nodes each of which requests a processing rule for processing a received packet; and a control apparatus that determines in response to the request the processing rule corresponding to the received packet and notifies the determined processing rule to at least one of the plural of nodes. One of the plurality of nodes forwards to the control apparatus a first packet for acquiring a destination address for a predetermined communication. The control apparatus in response to determination of the destination address determines a processing rule for processing a second packet to be transmitted to the destination address and notifies the determined processing rule to at least one of the plurality of nodes.

According to a second aspect of the present invention, there is provided a control apparatus, comprising: a receiving means (unit) that receives from at least one of a plrality of nodes a request for a processing rule for processing a received packet; a determination means (unit) that determines the processing rule corresponding to the received packet; and a notification means (unit) that notifies the determined processing rule to at least one of the plurality of nodes. The receiving means (unit) receives from at least one of the plurality of nodes a first packet for acquiring a destination address for a predetermined communication. The determination means (unit) in response to determination of the destination address determines a processing rule for processing a second packet to be transmitted to the destination address. The notification means (unit) notifies the determined processing rule to at least one of the plurality of nodes.

According to a third aspect of the present invention, there is provided a control method, comprising: by a control apparatus, receiving from at least one of a plurality of nodes a request for a processing rule for processing a received packet; determining the processing rule corresponding to the received packet; notifying the determined processing rule to at least one of the plurality of nodes; receiving from at least one of the plurality of nodes a first packet for acquiring a destination address for predetermined communication; in response to determination of the destination address, determining a processing rule for processing a second packet to be transmitted to the destination address; and notifying the determined processing rule to at least one of the plurality of nodes.

According to a fourth aspect of the present invention, there is provided a program, causing a computer to execute: receiving from at least one of a plurality of nodes a request for a processing rule for processing a received packet; determining the processing rule corresponding to the received packet; notifying the determined processing rule to at least one of the plurality of nodes; receiving from at least one of the plurality of nodes a first packet for acquiring a destination address for predetermined communication; in response to determination of the destination address, determining a processing rule for processing a second packet to be transmitted to the destination address; and notifying the determined processing rule to at least one of the plurality of nodes.

There is also provided a non-transitory computer-readable storage medium storing the program.

Advantageous Effects of Invention

The present invention provides the following advantage, but not restricted thereto. According to the communication system, the control apparatus, the control method and the program, calculation load of the control apparatus can be reduced by reduction of inquiries from each switch (or node) to the control apparatus.

BRIEF DESCRIPTION OF THE DRAWINGS

FIG. 9 is a table showing a configuration example of an address table in the second exemplary embodiment.

FIG. 15 is a diagram showing a configuration example of a table in the fifth exemplary embodiment.

PREFERRED MODES

In the present disclosure, there are various possible modes, which include the following, but not restricted thereto.

First Exemplary Embodiment

An exemplary embodiment will be described below with reference to drawings.

Figure 1:
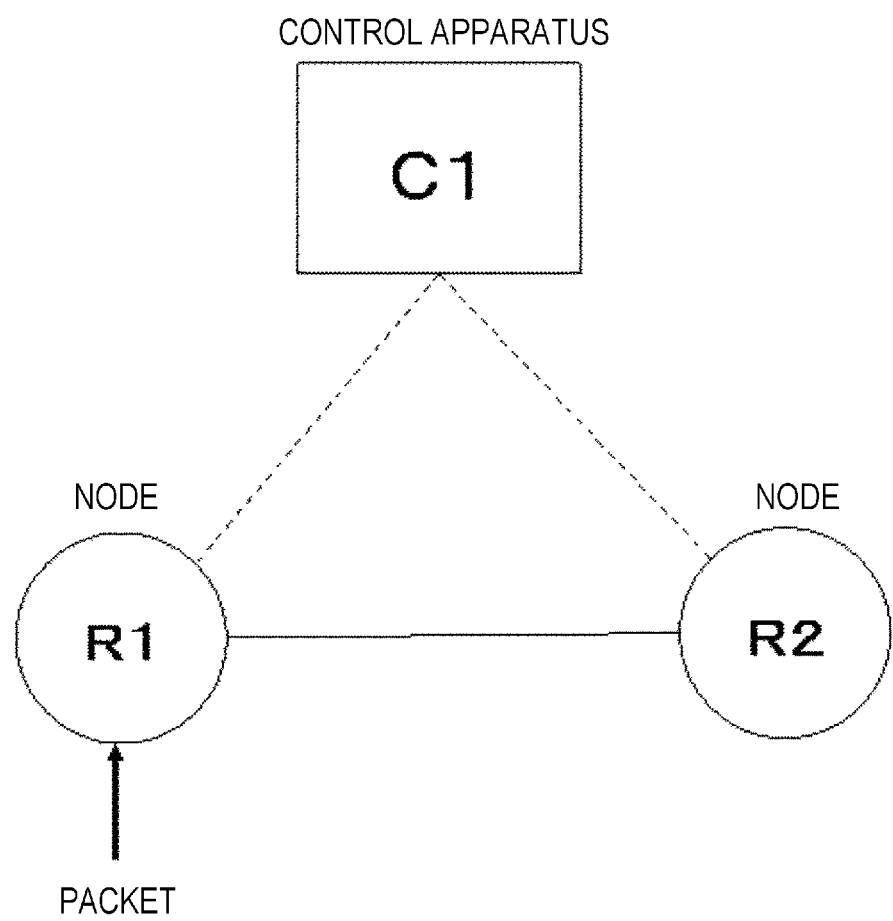
FIG. 1 is a diagram showing a configuration example of a network system in a first exemplary embodiment.

FIG. 1 is a diagram showing a configuration example of a network system according to a first exemplary embodiment.

In the first exemplary embodiment, a control apparatus C1 controls a packet forwarding path in response to a request from one of a plurality of nodes which are a node R1 and a node R2. As an example of such a related art of a centralized control type, there is provided an OpenFlow technology, as described above. The OpenFlow technology may be applied, or a different technology of the centralized control type may be used in order to carry out the present disclosure. A description will be given below about the exemplary embodiment when the OpenFlow technology has been applied to the present disclosure. In order to carry out the present disclosure, the control apparatus (controller) should be able to concentratedly control a packet forwarding path using a plurality of nodes. The present disclosure is not therefore limited to the OpenFlow technology.

As shown in FIG. 1, the network system in the first exemplary embodiment includes nodes R1 and R2 each for forwarding a packet. The network system also includes the control apparatus C1 for controlling the packet forwarding path in response to a request from the node R1 or the node R2.

The node R1 or R2 establishes a communication channel where security with the control apparatus C1 has been ensured (as shown by each dotted line in FIG. 1) so as to communicate with the control apparatus C1. Then, the node R1 or R2 processes a received packet according to a flow entry (or a processing rule (i.e., packet handling operation) for processing the packet) to be appropriately added or rewritten by the control apparatus C1.

Figure 2:
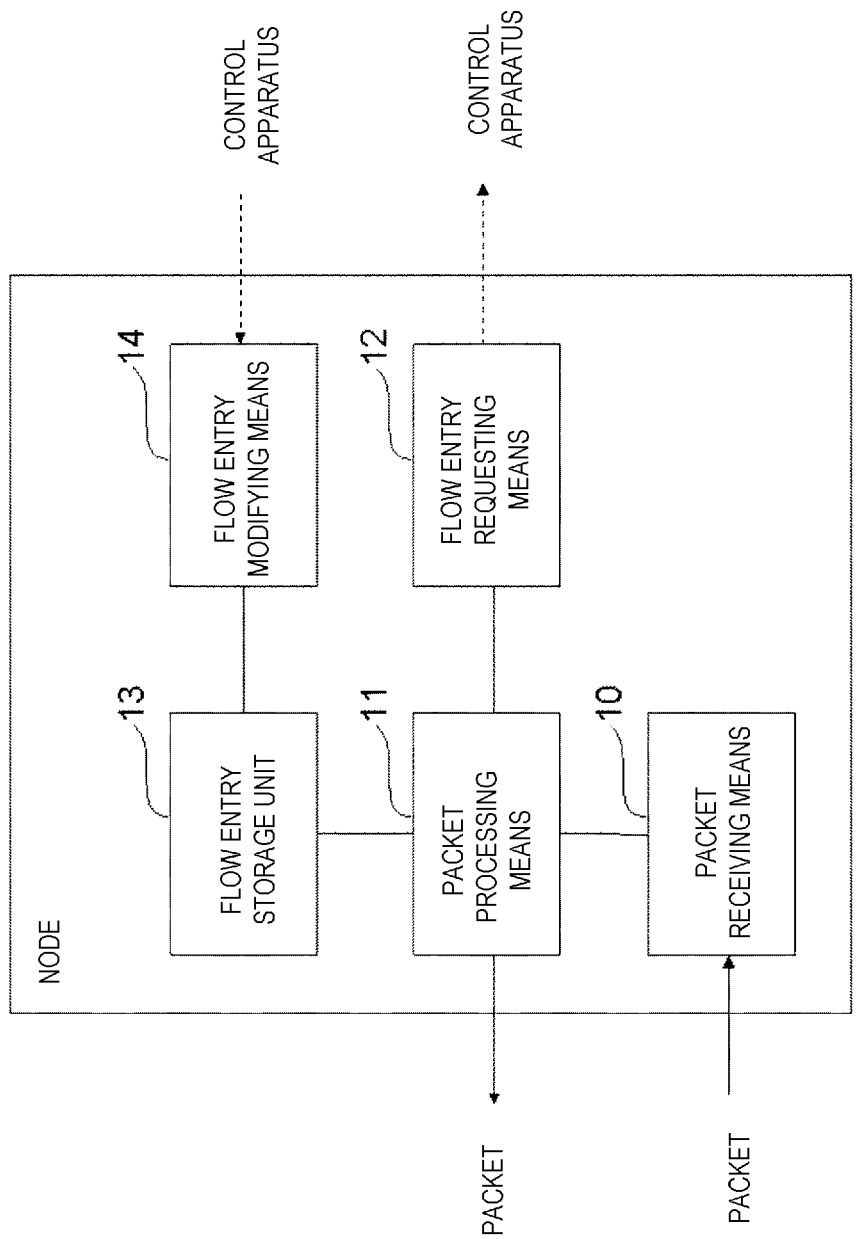
FIG. 2 is a diagram showing a configuration example of a node in the first exemplary embodiment.

FIG. 2 shows a configuration example of each of the nodes R1 and R2.

Packet receiving means (unit) 10 receives a packet. Packet processing means (unit) 11 processes the received packet according to a flow entry notified from the control apparatus C1. When the flow entry corresponding to the received packet is not present, flow entry requesting means 12 requests the flow entry for processing the packet to the control apparatus C1. A flow entry storage unit 13 stores flow entries each of which associates processing to be applied to a packet and a matching rule for identifying the packet to which the processing is to be applied. Flow entry modifying means 14 modifies corresponding one of the flow entries in the flow entry storage unit based on the flow entry notified from the control apparatus C1. No the term "means" used in the present disclosure may be termed as—unit—too, throughout the entire disclosure, even when not explicitly recited. That is, the term "means" represents at least one operational or functional unit.

The packet processing means 11 refers to the flow entry storage unit 13 to search for the flow entry having the matching rule that matches the packet received the packet receiving means 10. Then, when the flow entry corresponding to the received packet is present, the packet processing means 11 processes the received packet, based on the corresponding flow entry.

When the flow entry corresponding to the received packet is not present, the flow entry requesting means 12 requests the flow entry for processing the received packet to the control apparatus C1 through a secure channel. The flow entry modifying means 14 stores in the flow entry storage unit 13 the flow entry notified from the control apparatus C1 in response to the request.

Figure 3:
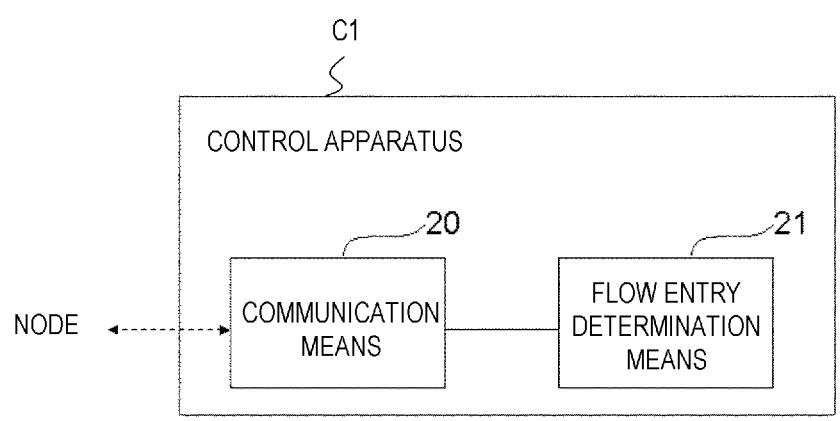
FIG. 3 is a diagram showing a configuration example of a control apparatus in the first exemplary embodiment.

As shown in FIG. 3, the control apparatus C1 includes communication means 20 for communicating with each of the nodes through the secure channel.

The communication means 20 of the control apparatus C1 receives a request for a flow entry from at least one of the nodes. For example, the communication means 20 receives from the node R1 the request for the flow entry for processing a packet received by the node R1.

The communication means 20 notifies the flow entry determined by flow entry determination means 21 to the at least one of the nodes. That is, the communication means 20 notifies a first flow entry to a first node, and notifies a second flow entry to at least one of the plurality of nodes. The communication means 20 notifies the first flow entry to the node R1, and notifies the second flow entry to the node R2, for example.

The control apparatus C1 receives from one of the nodes a first packet used for acquiring a destination address for a predetermined communication. The control apparatus C1 includes the flow entry determination means 21 for determining in advance a flow entry corresponding to a second packet to be transmitted to the destination address, in response to the determination of the destination address based on the first packet. When the flow entry corresponding to the second packet is not present, the node requests the control apparatus C1 to set the flow entry. In the present invention, however, the control apparatus C1 notifies to the node the flow entry corresponding to the packet to be transmitted to the address in advance, in response to resolution of the address based on the packet (first packet) requesting to acquire the address. Thus, the frequency of transmission of a request for a packet addressed to the acquired address to the control apparatus C1 from the node can be reduced.

The control apparatus C1 transmits a response packet (packet for notifying the acquired address) to the node that has transmitted the packet requesting to acquire the address. The node that has received the response packet forwards the response packet so that the response packet arrives at the terminal of the source of the request for acquiring the address. The node forwards the response packet to a port that has received the packet requesting to acquire the address.

The flow entry determination means 21 may determine a flow entry corresponding to the packet (first packet) for acquiring the address, and may notify the flow entry to the node. The flow entry corresponding to the packet for acquiring the address is a flow entry that specifies the forwarding path of the response packet for the packet for acquiring the address, for example.

The first packet used for acquiring the address means a packet to be transmitted for requesting the address, for example. The first packet is a packet to be transmitted by a terminal at which the data to be transmitted has been generated, in order to requesting the transmission destination address of the data, for example.

An APR request to be transmitted for acquiring the transmission destination MAC address of data by a terminal according to an ARP (Address Resolution Protocol) corresponds to the first packet used for acquiring the address. The ARP is a protocol used for acquiring from an IP address a MAC address corresponding to the IP address, in IPv4.

An NS (Neighbor Solicitation) packet to be transmitted for acquiring the transmission destination MAC address of data by a terminal according to an ND (Neighbor Discovery) corresponds to the first packet used for acquiring the address. The ND is a protocol used for acquiring from an IP address a MAC address corresponding to the IP address, in IPv6.

A name resolution request to be transmitted by a terminal to a name server in order to acquire the transmission destination MAC address of data, for example, corresponds to the first packet used for acquiring the address. The name server is the one in a DNS (Domain Name System) or a WINS (Windows (registered trademark) Name System), for example.

Any packet to be transmitted for requesting the address, not limited to the above-mentioned examples, may be used as the first packet used for acquiring the address.

Figure 4:
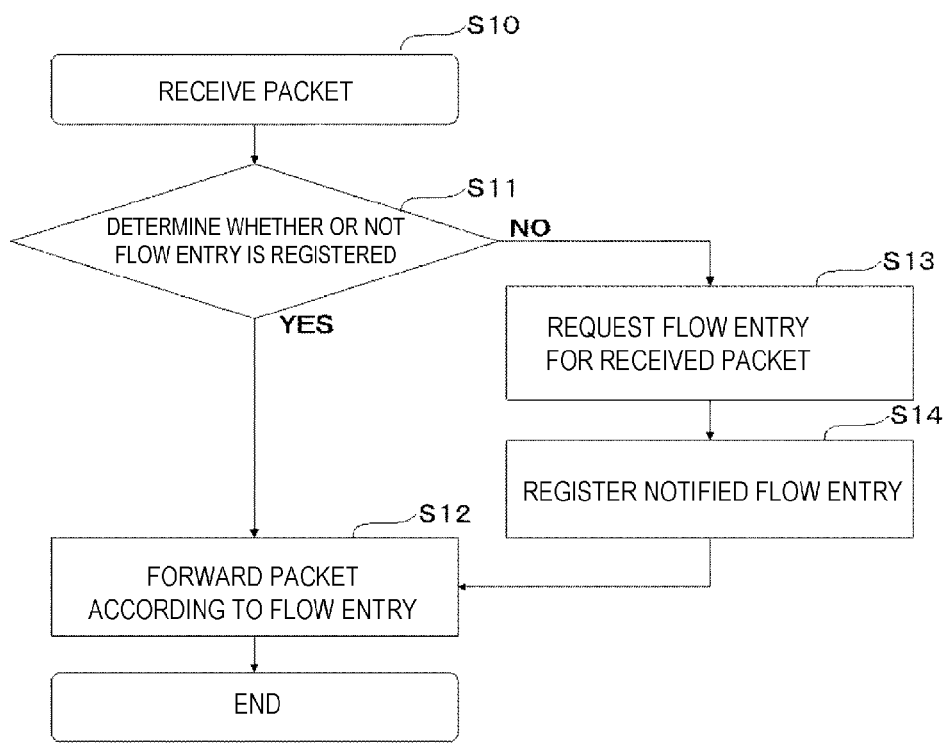
FIG. 4 is a diagram showing an operation example of the node in the first exemplary embodiment.

An operation example when the node R1 has received the first packet used for acquiring the address in the first exemplary embodiment will be described with reference to FIG. 4.

In step 10 (S10), the packet receiving means 10 of the node R1 receives the first packet used for acquiring the address.

In step 11 (S11), the packet processing means 11 of the node R1 determines whether or not a flow entry corresponding to the first packet is stored in the flow entry storage unit 13.

When it is determined as a result of the determination that the flow entry is registered, the packet processing means 11 processes the first packet according to the flow entry received by the packet receiving means 10.

When it is not determined as a result of determination that the flow entry is not registered, the flow entry requesting means requests the control apparatus C1 to set the flow entry for the first packet used for acquiring the address.

In step 14 (S14), the flow entry modifying means 14 registers the flow entry notified from the control apparatus C1 in the flow entry storage unit 13. Then, in step 12 (S12), the packet processing means 11 processes the first packet according to the notified flow entry.

Figure 5:
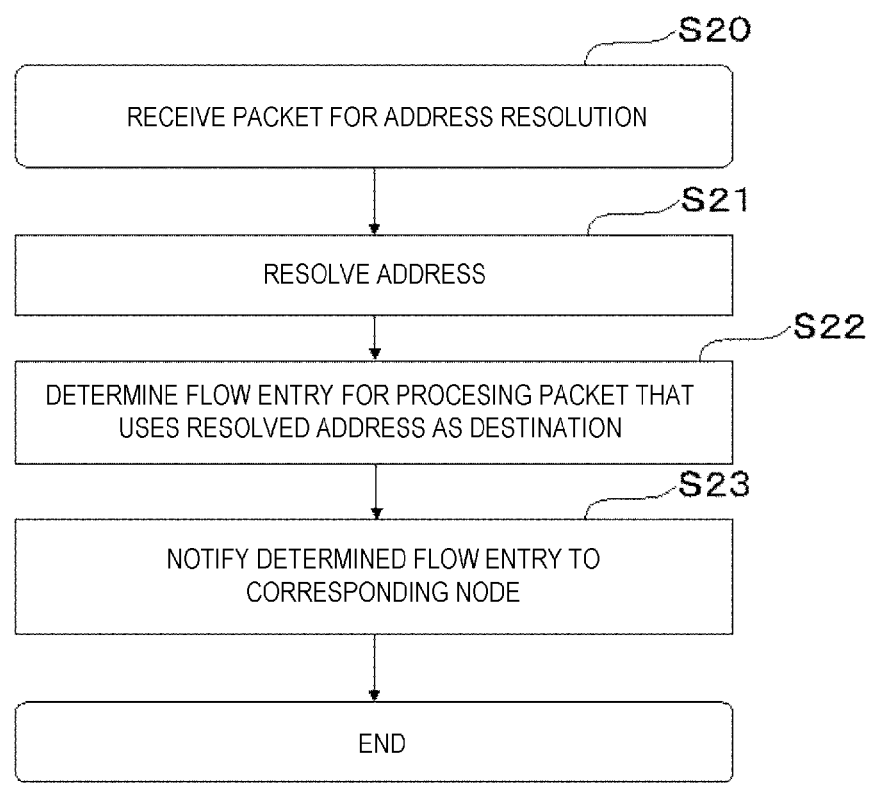
FIG. 5 is a diagram showing an operation example of the control apparatus in the first exemplary embodiment.

An operation example when the control apparatus C1 has received the packet (first packet) for address acquisition from the node R1 in the first exemplary embodiment will be described with reference to FIG. 5.

The control apparatus C1 receives the packet for address acquisition from the node R1 (step S20). For example, a terminal connected to the node R1 transmits the packet for address acquisition in order to acquire the destination address of a server or the like that becomes a communication partner. The node R1 that has received the packet for address acquisition forwards the packet to the control apparatus C1.

When receiving the packet for address acquisition, the control apparatus C1 performs processing for acquiring the destination address (step S21). The control apparatus C1 may resolve the destination address by requesting a different apparatus to acquire the address.

The control apparatus C1 determines a flow entry for processing the packet (second packet) to be transmitted to the destination address, in response to the determination of the destination address (step S22), and then notifies the determined entry the node corresponding to the determined, entry (step S23). The control apparatus C1 determines a shortest path or a path with small congestion from among paths to the communication partner corresponding to the destination address, as the forwarding path of the second packet. The control apparatus C1 determines the flow entry that defines processing content corresponding to the determined path. To take an example, the control apparatus C1 determines the path for forwarding the packet in the order of a transmission source terminal, the node R1, the node R2, and a communication partner server. In this case, the control apparatus C1 notifies to the node R1 the flow entry instructing forwarding of the second packet from a port associated with a link connected to the node R2, and notifies to the node R2 the flow entry instructing forwarding of the second packet from a port associated with a link connected to the communication partner server.

Figure 6:
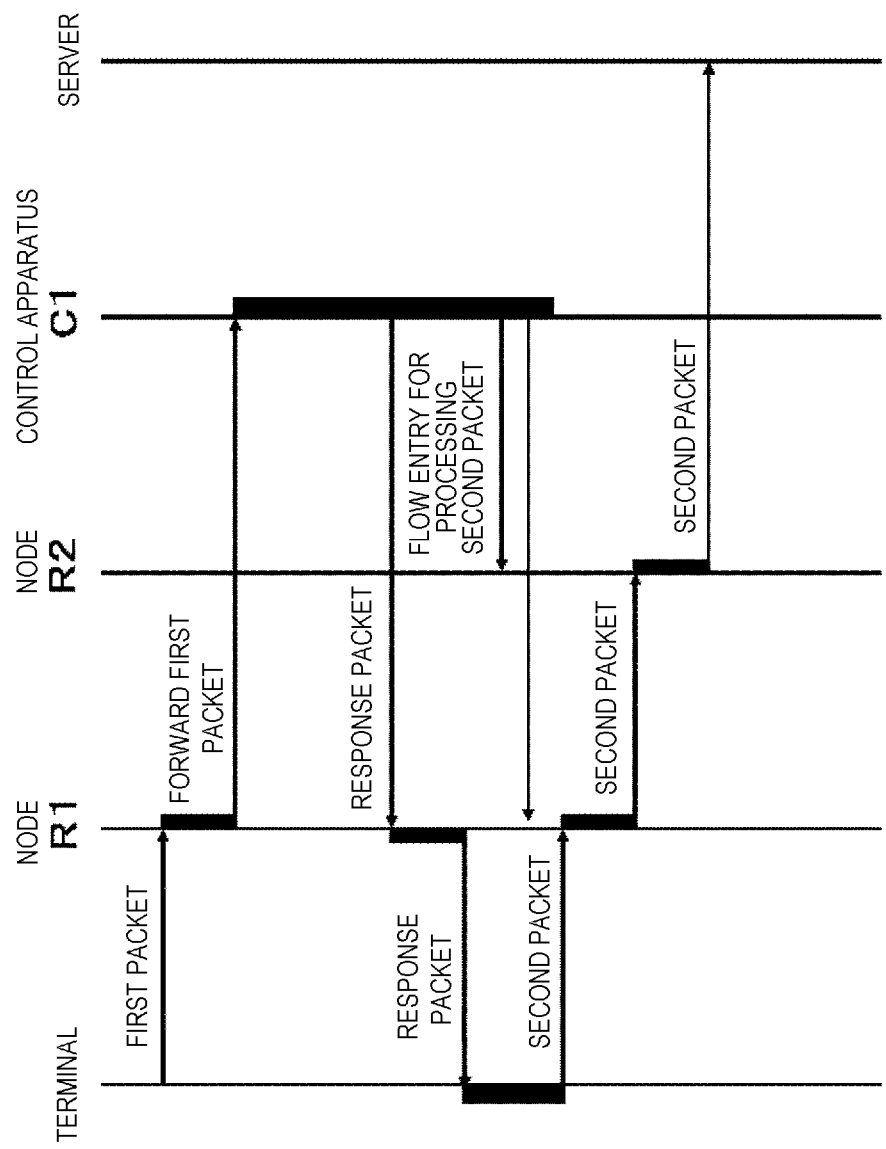
FIG. 6 is a sequence diagram showing an operation example in the first exemplary embodiment.

FIG. 6 is a sequence diagram showing an operation example of the first exemplary embodiment FIG. 6 is provided for exemplification purpose, and operation is not limited to the example described in FIG. 6.

The terminal connected to the node R1 transmits the packet (first packet) for address acquisition to the node R1 in order to acquire the address of the server that becomes the destination for communication.

The node R1 forwards the packet for address acquisition to the control apparatus C1.

The control apparatus C1 acquires the destination address of the server that becomes the communication partner for the terminal, and notifies the acquired destination address to the terminal using a response packet. The response packet is transmitted to the terminal through the node R1.

The control apparatus C1 notifies a flow entry defining a processing method of the packet (second packet) to be transmitted to the destination address to each of the nodes R1 and R2, in response to the determination of the destination address. That is, the control apparatus C1 notifies the flow entry corresponding to the second packet to each of the nodes before each of the nodes R1 and R2 receives the second packet.

Each of the nodes R1 and R2 forwards the second packet according to the flow entry notified from the control apparatus C1. Since the flow entry that defines the processing method of the second packet is notified in advance, each of the nodes R1 and R2 can forward the packet without requesting the control apparatus C1 to set the flow entry.

As described above, in the first exemplary embodiment, the control apparatus C1 sets the flow entry in advance, thereby allowing reduction of flow entry setting requests by each node. Thus, in the first exemplary embodiment, a load on the control apparatus C1 can be reduced.

Second Exemplary Embodiment

In a second exemplary embodiment, a control apparatus C1 includes an address table with an address of a destination apparatus stored therein.

Figure 7:
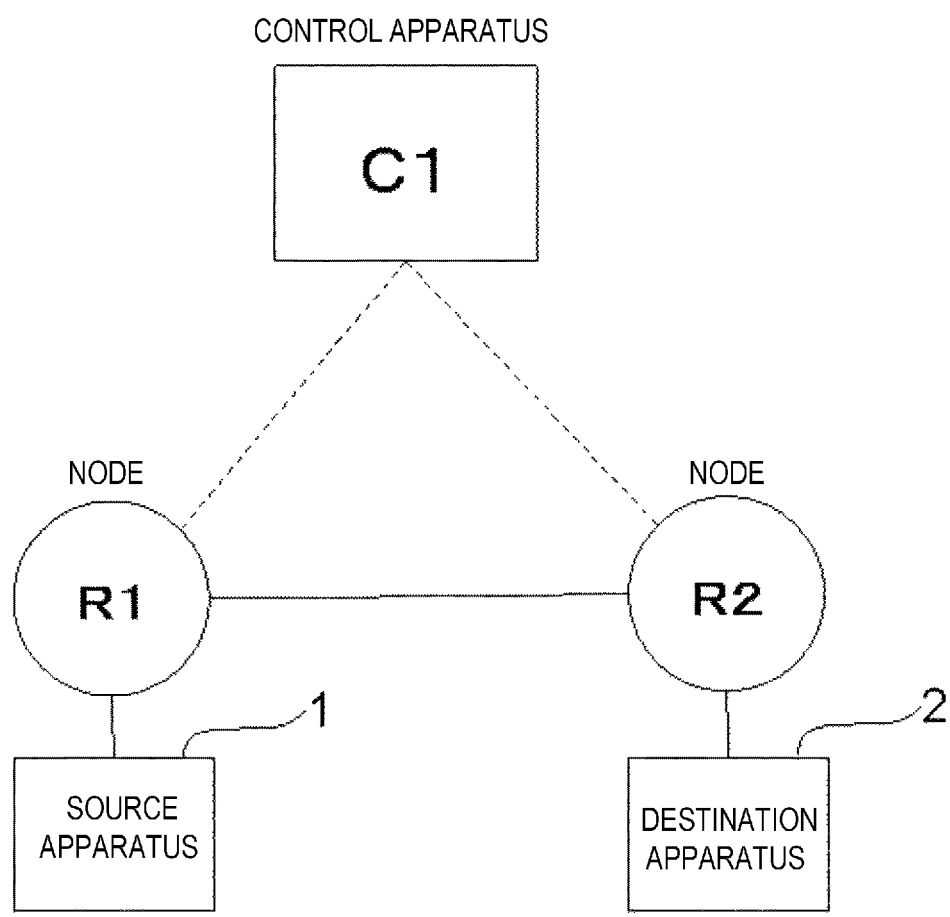
FIG. 7 is a diagram showing a configuration example of a network system in a second exemplary embodiment.

FIG. 7 shows a configuration example of a network system in the second exemplary embodiment.

A source apparatus 1 and a destination apparatus 2 are each a terminal or a server, for example, and transmit and receive a data packet to each other. When the data packet to be transmitted is generated, the source apparatus 1 transmits a packet (first packet used for address acquisition) requesting the address of the destination apparatus 2 that is the transmission destination of the data packet.

Figure 8:
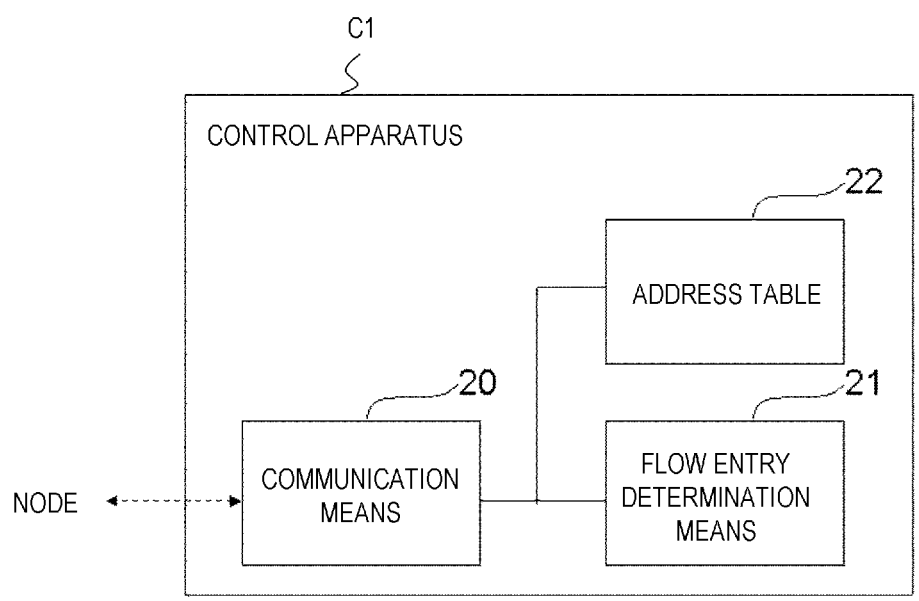
FIG. 8 is a diagram showing a configuration example of a control apparatus in the second exemplary embodiment.

FIG. 8 shows a configuration example of the control apparatus C1 in the second exemplary embodiment. As shown in FIG. 8, the control apparatus C1 includes an address table 22 with the address of the destination apparatus 2 stored therein. The configuration example of each of nodes R1 and R2 is the same as that in the first exemplary embodiment.

The address table 22 associates and stores information on the destination apparatus 2 and the address of the destination apparatus 2. The address table 22 associates and stores a first address of the destination apparatus 2 and a second address of the destination apparatus 2, for example. The address table 22 associates and stores the IP address of the destination apparatus 2 and the MAC address of the destination apparatus 2, for example.

FIG. 9 shows a configuration example of the address table 22 when the address table 22 associates and stores the IP address of the destination apparatus 2 and the MAC address of the destination apparatus 2, for example. The address table 22 associates and stores the IP address and the MAC address of each of a plurality of apparatuses that can be the destination apparatus 2, for example.

Each correspondence relationship in the address table 22 may be registered in for example. Each correspondence relationship in the address table 22 may be periodically collected by the control apparatus C1, for example. Each correspondence relationship in the address table 22 may be collected whenever a packet used for address acquisition is received from the source apparatus 1, for example. Each correspondence relationship in the address table 22 may be registered and/or collected by an arbitrary method not limited to the method that has been exemplified.

Flow entry determination means 21 in the second exemplary embodiment refers to the address table 22 to search for the address of the destination apparatus 2 requested by the first packet. The first address of the destination apparatus 2 is stored in the first packet. The flow entry determination means 21 searches for the second address corresponding to the first address of the destination apparatus 2. The flow entry determination means 21 determines a flow entry for processing a second packet using the searched address of the destination apparatus 2 as the destination, based on the searched address of the destination apparatus 2.

The flow entry determination means 21 in the second exemplary embodiment may be configured to generate a packet (response packet) that notifies the address of the destination apparatus 2, for the source apparatus 1 that has transmitted the first packet used for address acquisition. The flow entry determination means 21 in this case searches the address table 22 for the address requested by the first packet to generate the packet (response packet) with the searched address stored therein. The flow entry determination means 21 transmits the generated response packet to the node R1 through communication means 20. The node R1 transmits the response packet to the source apparatus 1.

Third Exemplary Embodiment

In a third exemplary embodiment, a control apparatus C1 includes ARP (Address Resolution Protocol) processing means. An ARP is a protocol used for acquiring from an IP address a MAC address corresponding to the IP address.

The configuration example of a network system in the third exemplary embodiment is the same as that in FIG. 7.

Figure 10:
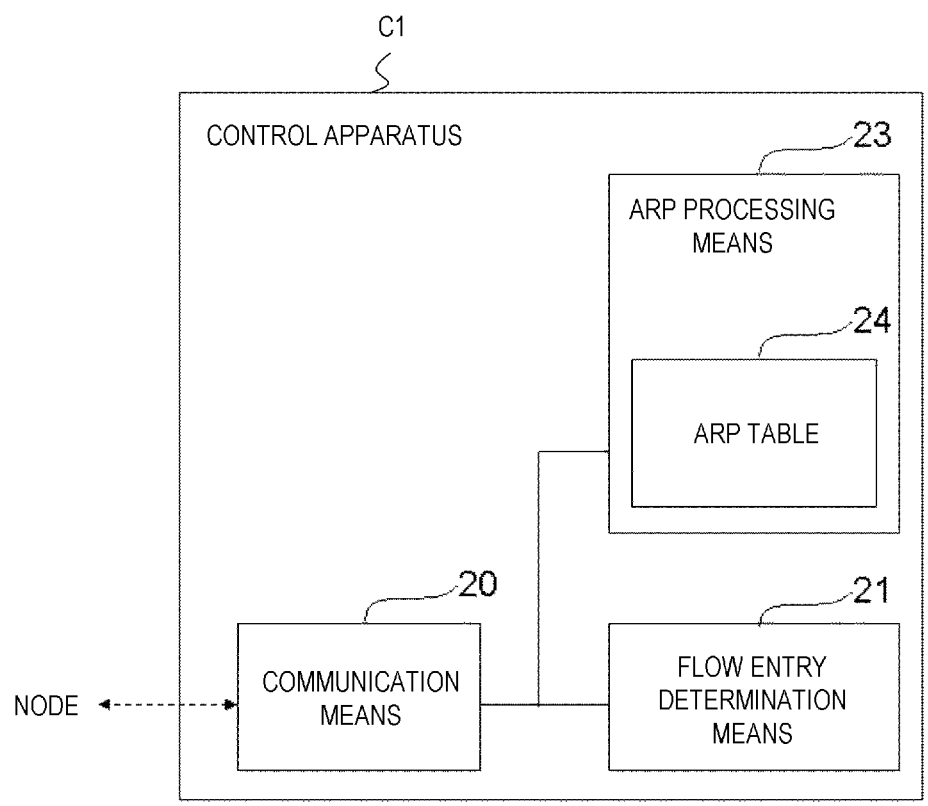
FIG. 10 is a diagram showing a configuration example of a control apparatus in a third exemplary embodiment.

FIG. 10 shows a configuration example of the control apparatus C1 in the third exemplary embodiment. As shown in FIG. 10, the control apparatus C1 includes ARP processing means 23. The configuration example of each of nodes R1 and R2 is the same as that in FIG. 2.

The ARP processing means 23 includes an ARP table 24 where correspondence relationships between IP addresses and MAC addresses are recorded. The ARP table 24 associates and stores an IP address of a destination apparatus 2 and a MAC address of the destination apparatus 2, for example. The ARP table 24 associates and stores the IP address and the MAC address of each of a plurality of apparatuses that can be the destination apparatus 2, for example.

Each correspondence relationship between the IP addresses and the MAC addresses in the ARP table 24 is created by a method of setting the correspondence relationship in advance, a method of periodically collecting the correspondence relationship, or a method of collecting the correspondence relationship for each receipt of an ARP request, or the like, for example. Each correspondence relationship in the ARP table 24 is created by a method not limited to each of the methods that have been exemplified.

Flow entry determination means 21 executes the followings:
(1) The flow entry determination means 21 resolves the MAC address of the destination apparatus 2 in response to the ARP request; and
(2) The flow entry determination means 21 determines a flow entry for processing a packet to be transmitted to the MAC address, in response to the determination of the MAC address.

The flow entry determination means 21 in the third exemplary embodiment may be configured to generate an ARP reply notifying the address of the destination apparatus 2, for a source apparatus 1 that has transmitted the ARP request. In this case, the flow entry determination means 21 generates the ARP reply with the MAC address searched for from the ARP table 24 stored therein. The flow entry determination means 21 transmits the generated ARP reply to the node R1 through communication means 20. The node R1 forwards the ARP reply to the source apparatus 1.

The flow entry determination means 21 may be configured to determine a flow entry for processing the ARP reply when the flow entry determination means 21 generates the ARP reply. The flow entry determination means 21 determines the flow entry corresponding to the transmission path of the ARP reply, for example. The flow entry determination means 21 notifies the flow entry for processing the ARP reply to the node R1 through the transmission means 20. The node R1 processes the ARP reply according to the notified flow entry.

Figure 11:
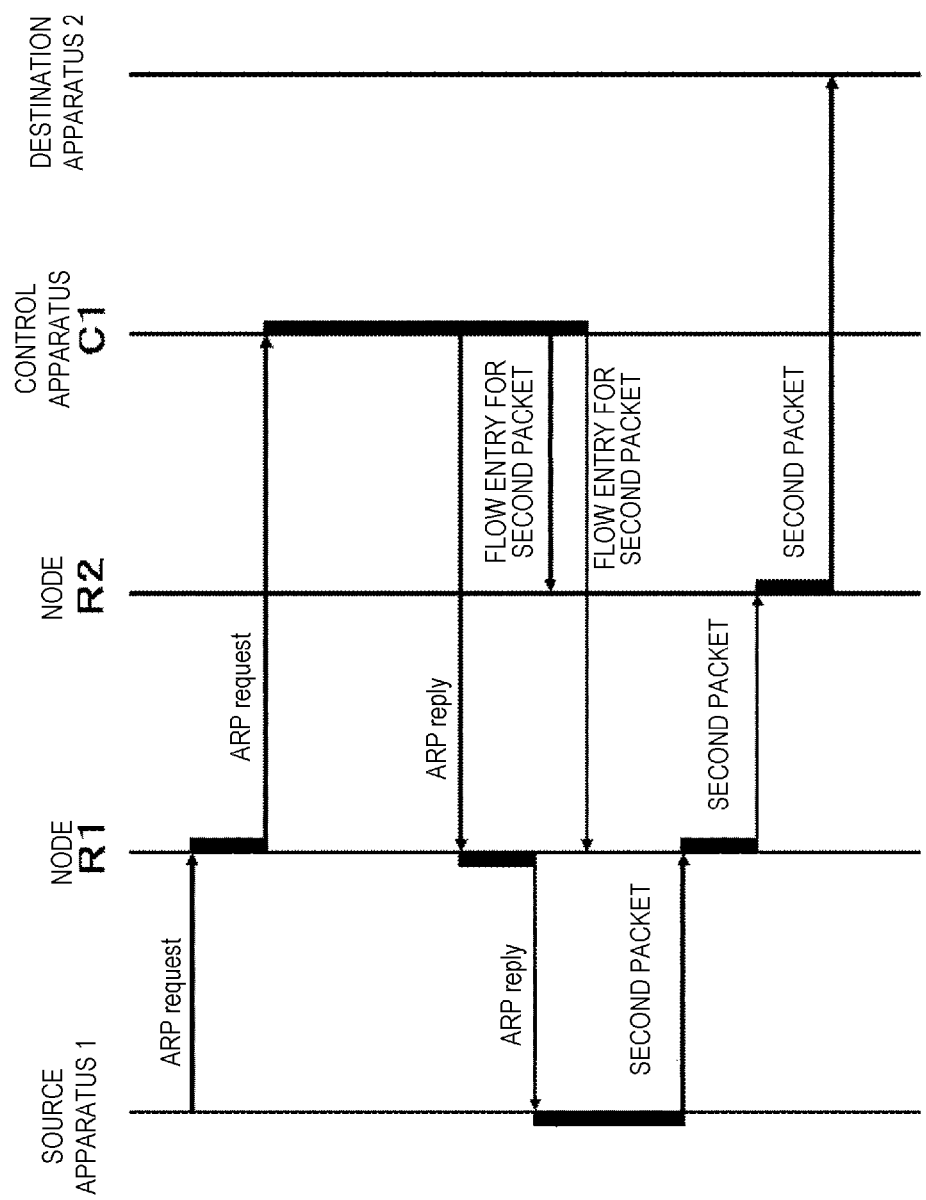
FIG. 11 is a sequence diagram showing an operation example in the third exemplary embodiment.

FIG. 11 is a sequence diagram showing an operation example of the third exemplary embodiment.

The source apparatus 1 transmits the ARP request with the IP address of the destination apparatus 2 stored therein through the node R1.

When receiving the ARP request, the node R1 forwards the ARP request to the control apparatus C1.

The control apparatus C1 refers to the ARP table 24 to search for the MAC address corresponding to the IP address included in the ARP request. The control apparatus C1 notifies the searched MAC address to the source apparatus 1 as the ARP reply. The ARP replay is notified to the source apparatus 1 through the node R1.

The control apparatus C1 determines a flow entry for processing a packet (second packet) addressed to the MAC address, in response to the determination of the MAC address. The control apparatus C1 notifies the determined flow entry to each of the nodes R1 and R2.

Fourth Exemplary Embodiment

In a fourth exemplary embodiment, a control apparatus C1 includes ND (Neighbor Discovery) processing means. An ND is a protocol used for acquiring from an IP address a MAC address corresponding to the IP address, in IPv6.

The configuration example of a network system in the fourth exemplary embodiment is the same as that in FIG. 7.

Figure 12:
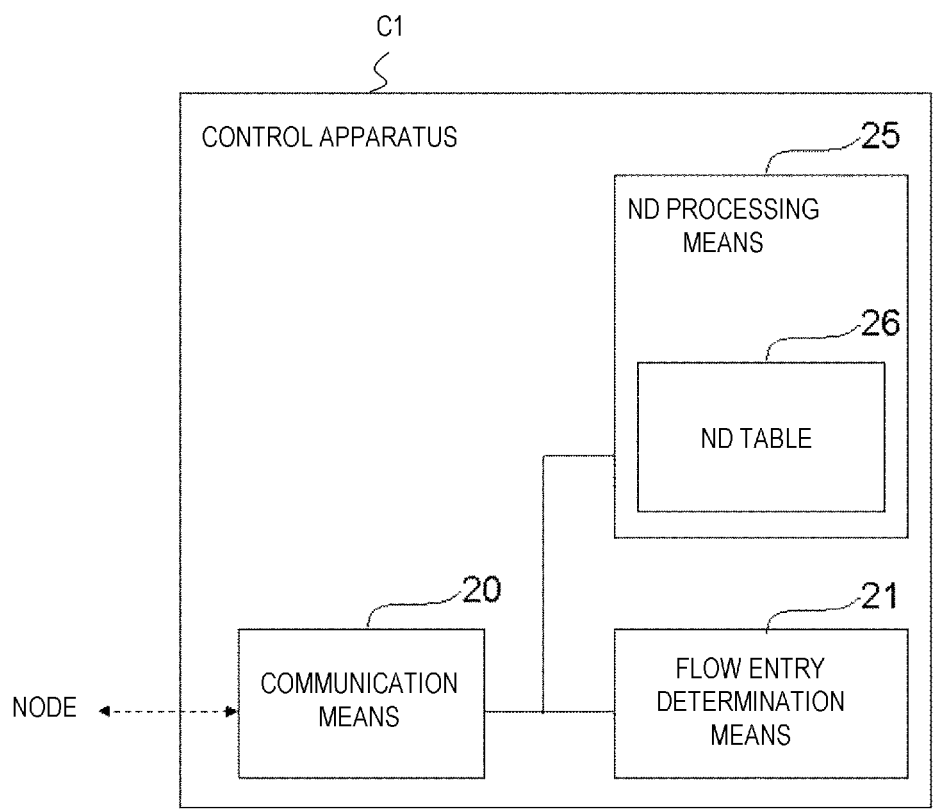
FIG. 12 is a diagram showing a configuration example of a control apparatus in a fourth exemplary embodiment.

FIG. 12 shows a configuration example of the control apparatus C1 in the fourth exemplary embodiment. As shown in FIG. 12, the control apparatus C1 includes ND processing means 25. The configuration example of each of nodes R1 and R2 is the same as that in FIG. 2.

The ND processing means 25 includes an ND table 26 where correspondence relationships between IP addresses and MAC addresses are recorded. The ND table 26 associates and stores the IP address of a destination apparatus 2 and the MAC address of the destination apparatus 2, for example. The ND table 26 associates and stores the IP address and the MAC address of each of a plurality of apparatuses that can be the destination apparatus 2, for example.

Each correspondence relationship between the IP address and the MAC address in the ND table 26 is created by a method of setting the correspondence relationship in advance, a method of periodically collecting the correspondence relationship, or a method of collecting the correspondence relationship for each receipt of an NS (Neighbor Solicitation) packet, or the like, for example. Each correspondence relationship in the ND table 26 is created by a method not limited to each of the methods that have been exemplified.

Flow entry determination means 21 acquires the MAC address corresponding to the IP address of the destination apparatus 2 stored in the payload of an NS packet, by referring to the ND table 26.

The flow entry determination means 21 executes the followings:
(1) The flow entry determination means 21 determines the MAC address of the destination apparatus 2 in response to the NS packet; and (2) The flow entry determination means 21 determines a flow entry for processing a packet to be transmitted to the MAC address, according to the determination of the MAC address.

The flow entry determination means 21 in the fourth exemplary embodiment may be configured to generate an NA (Neighbor Advertisement) packet for notifying the address of the destination apparatus 2, for a source apparatus 1 that has transmitted the NS packet, in this case, the flow entry determination means 21 generates the NA packet with the MAC address searched for from the ND table 26 stored therein. The flow entry determination means 21 transmits the generated NA packet to the node R1 through communication means 20, The node R1 forwards the NA packet to the source apparatus 1.

The flow entry determination means 21 may be configured to determine a flow entry for processing the NA packet when the flow entry determination means 21 generates the NA packet. The flow entry determination means 21 determines the flow entry corresponding to the transmission path of the NA packet, for example. The flow entry determination means 21 notifies the flow entry for processing the NA packet to the node R1 through the transmission means 20. The node R1 processes the NA packet according to the notified flow entry.

Figure 13:
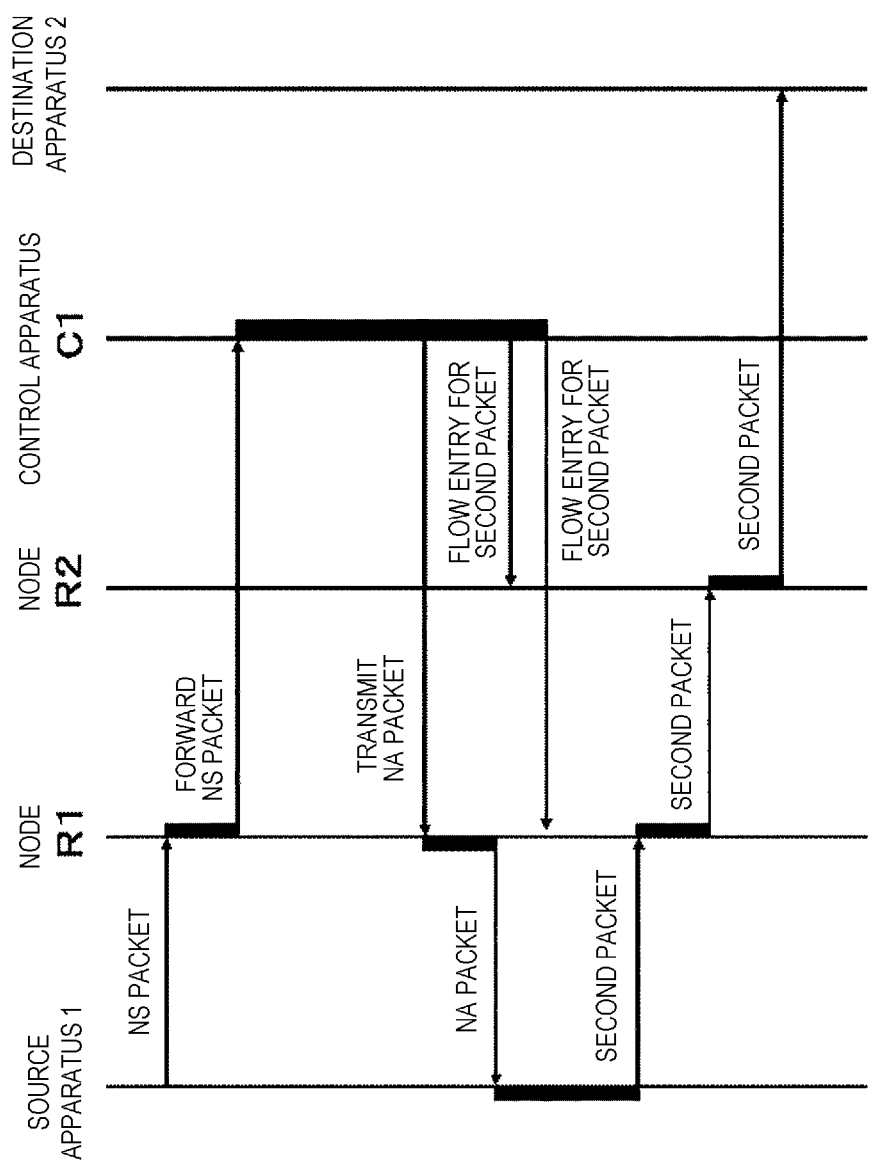
FIG. 13 is a sequence diagram showing an operation example in the fourth exemplary embodiment.

FIG. 13 is a sequence diagram showing an operation example of the fourth exemplary embodiment.

The source apparatus 1 transmits the NS packet with the IP address of the destination apparatus 2 stored therein through the node R1.

When receiving the NS packet, the node R1 forwards the NS packet to the control apparatus C1.

The control apparatus C1 refers to the ND table 26 to search for the MAC address corresponding to the IP address included in the NS packet. The control apparatus C1 notifies the searched MAC address to the source apparatus 1 as the NA packet. The NA packet is notified to the source apparatus 1 through the node R1.

The control apparatus C1 determines the flow entry for processing the packet (second packet) addressed to the MAC address, in response to the determination of the MAC address. The control apparatus C1 notifies the determined flow entry to each of the nodes R1 and R2.

Fifth Exemplary Embodiment

In a fifth exemplary embodiment, a source apparatus 1 acquires the IP address or the MAC address of a destination apparatus 2 using the host name of the destination apparatus 2.

Figure 14:
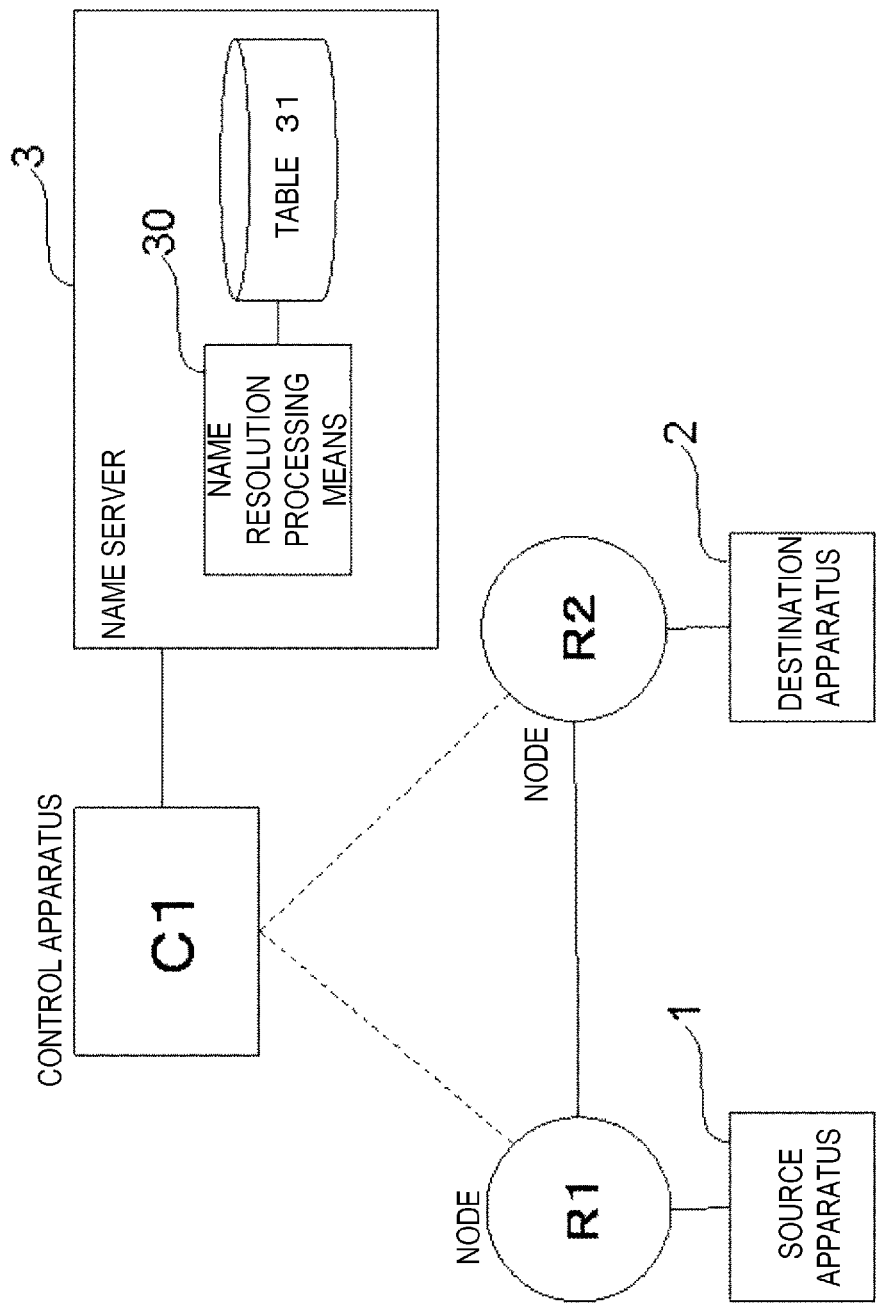
FIG. 14 is a diagram showing a configuration example of a network system in a fifth exemplary embodiment.

FIG. 14 is a diagram showing a configuration example of a network system in the fifth exemplary embodiment.

As shown in FIG. 14, the network system in the fifth exemplary embodiment includes a name server 3 that resolves the IP address or the MAC address of the destination apparatus 2 using the host name of the destination apparatus 2.

When receiving a name resolution request with the host name stored therein, the name server 3 replies a name resolution response with the IP address or the MAC address corresponding to the hot name stored therein. The name server 3 is the one in a DNS (Domain Name System) or a WINS (Windows Name System), for example. The name server 3 may be an arbitrary apparatus if the name server 3 is an apparatus for notifying the IP address or the MAC address using the host name.

The name server 3 includes a table 31 that associates and stores host names and IP addresses or MAC addresses, and name resolution processing means 30 for referring to the table 31 to search for the address using the host name. FIG. 15 is a table showing a configuration example of the table 31. As shown in FIG. 15, the table 31 associates and records the host name of an apparatus and the IP address of the apparatus, for example.

When receiving a name resolution request from a node, a control apparatus C1 forwards the request to the name server 3.

When receiving the name resolution request with the host name of the destination apparatus 2 stored therein, the name server 3 refers to the table 31 to search for the IP address or the MAC address corresponding to the host name. The name server 3 transmits a name resolution response with the IP address or the MAC address corresponding to the host name stored therein to the control apparatus C1. The control apparatus C1 transmits the name resolution response to the source apparatus 1 that has transmitted the name resolution request.

The configuration example of each of nodes R1 and R2 and the control apparatus C1 in the fifth exemplary embodiment is the same as that in FIG. 2.

Figure 16:
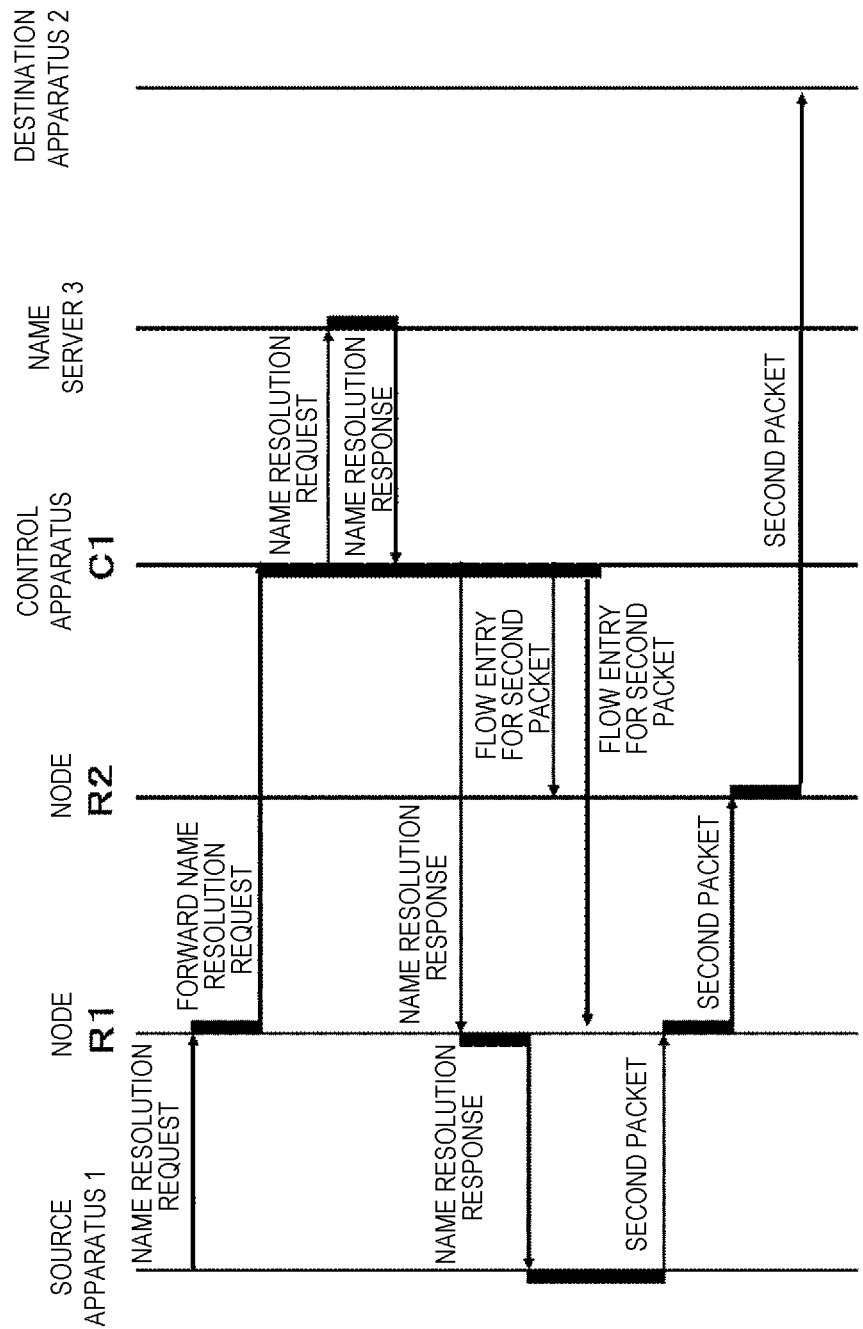
FIG. 16 is a sequence diagram showing an operation example in the fifth exemplary embodiment.

FIG. 16 is a sequence diagram showing an operation example of the fifth exemplary embodiment.

The source apparatus 1 transmits the name resolution request that specifies the host name of the destination apparatus 2 to the node R1 connected to the source apparatus 1.

When receiving the name resolution request, the node R1 forwards the name resolution request to the control apparatus C1.

The control apparatus C1 requests the name server 3 to perform name resolution.

The name server 3 searches for the address corresponding to the host name specified by the name resolution request. The name server 3 notifies the searched address to the control apparatus C1 as the name resolution response.

The control apparatus C1 transmits the name resolution response to the source apparatus 1.

The control apparatus C1 determines a flow entry corresponding to a packet (second packet) to be transmitted to the address in response to resolution of the address corresponding to the host name. The control apparatus C1 notifies the determined, flow entry to each of the nodes R1 and R2.

Though the above description was given to the preferred exemplary embodiments, the present invention is not limited to the above-mentioned exemplary embodiments. Particularly, the method (the steps thereof) may be implemented by a program(s), and the elements of the entire system including nodes, control apparatus, server, and components thereof may be implemented using at least one computer which is operable by the program(s).

The disclosure of the above Patent Literatures is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

REFERENCE SIGNS LIST 1 source apparatus
2 destination apparatus
3 name server
10 packet receiving means (unit)
11 packet processing means (unit)
12 flow entry requesting means
13 flow entry storage unit
14 flow entry modifying means (unit)
20 communication means
21 flow entry determination means (unit)
22 address table
23 ARP processing means (unit)
24 ARP table
25 ND processing means (unit)
26 ND table
30 name resolution processing means (unit)
31 table

What is claimed is:

1. A communication system, comprising:
a plurality of nodes each of which requests a processing rule for processing a received packet;
a control apparatus that determines in response to the request the processing rule corresponding to the received packet and notifies the determined processing rule to at least one of the plurality of nodes; and
a server that stores a destination address,
wherein
one of the plurality of nodes forwards to the control apparatus a first packet for acquiring a destination address for a predetermined communication,
the control apparatus in response to determination of the destination address determines a processing rule for processing a second packet to be transmitted to the destination address and notifies the determined processing rule to at least one of the plurality of nodes, and
the control apparatus acquires the destination address from the server in response to reception of the first packet and notifies the acquired address to a source apparatus of the first packet.

2. The communication system according to claim 1, wherein the control apparatus in response to determination of the destination address determines in advance a processing rule for processing the second packet.

3. The communication system according to claim 2, wherein
if at least one of the plurality of nodes does not store a processing rule corresponding to the received packet, the at least one of the plurality of nodes requests a processing rule to the control apparatus, and
the control apparatus in response to determination of the destination address notifies the processing rule corresponding to the second packet to the at least one of the plurality of nodes before the at least one of the plurality of nodes requests a processing rule for processing the second packet.

4. The communication system according to claim 2, wherein the control apparatus determines, as the processing rule for processing the second packet, a processing rule corresponding to a path for forwarding the second packet from a source apparatus of the first packet to a destination apparatus of the predetermined communication.

5. The communication system according to claim 1, wherein
if at least one of the plurality of nodes does not store a processing rule corresponding to the received packet, the at least one of the plurality of nodes requests a processing rule to the control apparatus, and
the control apparatus in response to determination of the destination address notifies the processing rule corresponding to the second packet to the at least one of the plurality of nodes before the at least one of the plurality of nodes requests a processing rule for processing the second packet.

6. The communication system according to claim 5, wherein the control apparatus determines, as the processing rule for processing the second packet, a processing rule corresponding to a path for forwarding the second packet from a source apparatus of the first packet to a destination apparatus of the predetermined communication.

7. The communication system according to claim 1, wherein the control apparatus determines, as the processing rule for processing the second packet, a processing rule corresponding to a path for forwarding the second packet from a source apparatus of the first packet to a destination apparatus of the predetermined communication.

8. The communication system according to claim 1, wherein
the server associates and stores information on a destination apparatus of the predetermined communication and the destination address, and
the control apparatus acquires from the server a destination address corresponding to the information on the destination apparatus in response to reception of the first packet including the information on the destination apparatus and notifies the acquired destination address to the source apparatus of the first packet.

9. The communication system according to claim 1, wherein
the server associates and stores a destination host name of the predetermined communication and the destination address, and
the control apparatus acquires from the server the destination address corresponding to the destination host name in response to reception of the first packet including the destination host name and notifies the acquired destination address to the source apparatus of the first packet.

10. A control apparatus, comprising:
a receiving unit that receives from at least one of a plurality of nodes a request for a processing rule for processing a received packet;
a determination unit that determines the processing rule corresponding to the received packet;
a notification unit that notifies the determined processing rule to at least one of the plurality of nodes; and
a server that stores the destination address,
wherein
the receiving unit receives from at least one of the plurality of nodes a first packet for acquiring a destination address for a predetermined communication,
the determination unit in response to determination of the destination address determines a processing rule for processing a second packet to be transmitted to the destination address,
the notification unit notifies the determined processing rule to at least one of the plurality of nodes, and the control apparatus acquires the destination address from the server in response to reception of the first packet and notifies the acquired address to a source apparatus of the first packet.

11. The control apparatus according to claim 10, wherein the determination means in response to determination of the destination address determines in advance the processing rule for processing the second packet.

12. A control method, comprising:

by a control apparatus, receiving from at least one of a plurality of nodes a request for a processing rule for processing a received packet;

determining the processing rule corresponding to the received packet;

notifying the determined processing rule to at least one of the plurality of nodes;

receiving from at least one of the plurality of nodes a first packet for acquiring a destination address for predetermined communication, said destination address stored on a server;

acquiring the destination address from the server in response to receiving the first packet and notifying the acquired address to a source apparatus of the first packet;

in response to determination of the destination address, determining a processing rule for processing a second packet to be transmitted to the destination address; and notifying the determined processing rule to at least one of the plurality of nodes.

13. The control method according to claim 12, comprising in response to determination of the destination address, determining in advance the processing rule for processing the second packet.

\* \* \* \* \*